July 11, 1939.  E. A. STULLER  2,165,768
TIRE CHAIN
Filed April 27, 1937
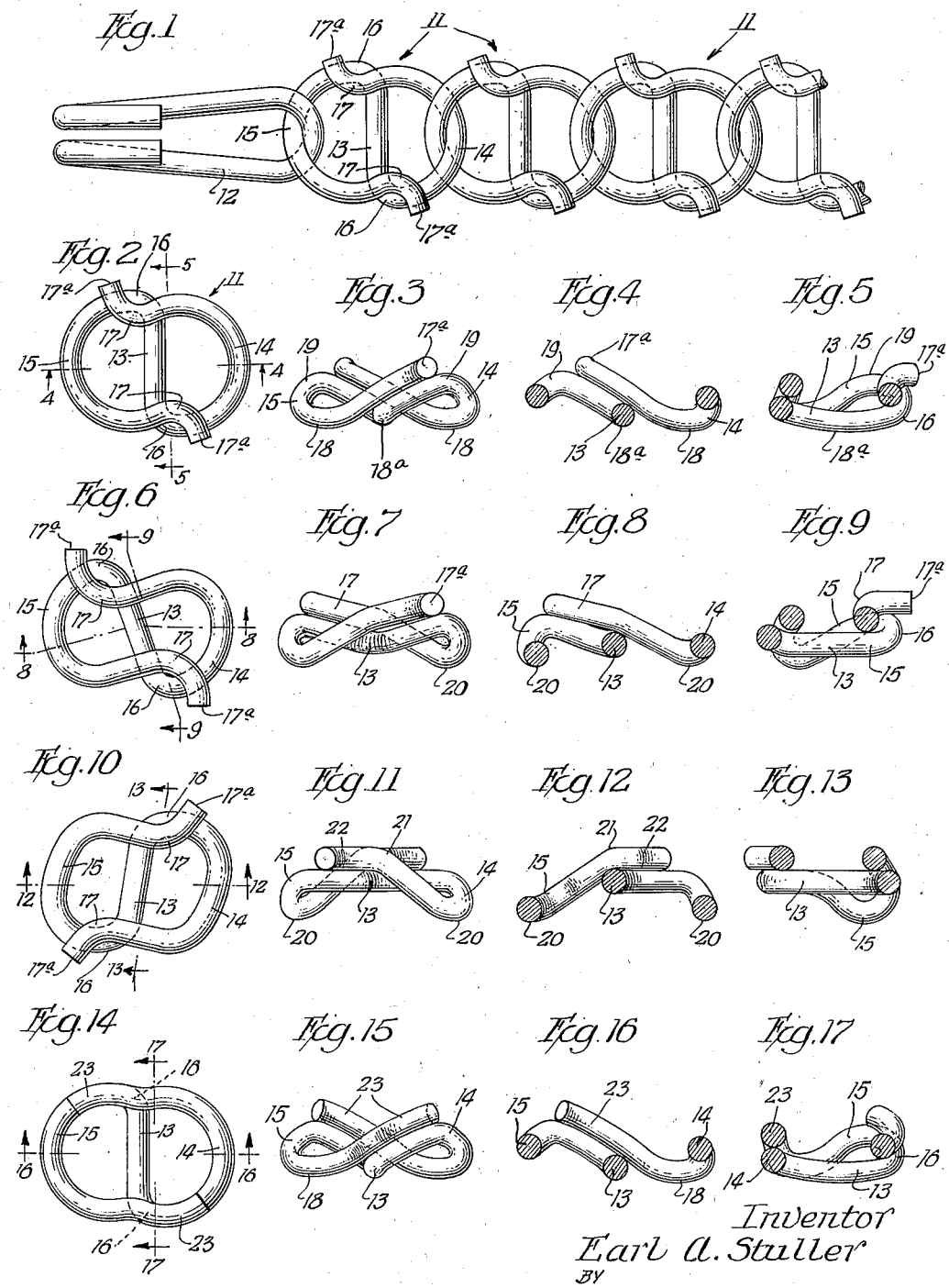
Inventor
Earl A. Stuller
BY
Parker, Carlson, Pigeon & Hubbard
Attorneys Patented July 11, 1939

2,165,768

UNITED STATES PATENT OFFICE 2,165,768

TIRE CHAIN

Earl A. Stuller, Chicago, Ill., assignor to Western Chain Products Co., Chicago, Ill., a corporation of Illinois Application April 27, 1937, Serial No. 139,242

7 Claims. (Cl. 152—243)

The invention relates to tire chains and more particularly to chains of the type known as cross chains and especially adapted for road engagement.

The general object of the invention is to provide a new and improved chain of this character which is simple in construction, may be readily manufactured at a relatively low cost and without the use of complicated and specialized machinery, which has greatly improved traction qualities, and is capable of withstanding long wear and rough usage.

Another object of the invention is to provide a chain composed of links of new and improved form, in which the ends of a single piece of bar stock are arranged to extend in spaced, substantially parallel relationship along opposite sides of the link and across the road engaging surfaces thereof, each of said ends being fashioned and disposed to provide a high degree of wear and traction.

Other objects and advantages will become apparent in the following description and from the accompanying drawing, in which:

Figure 1 is a view in plan of the road engaging side of a length of cross chain embodying the features of the invention.

Fig. 2 is a plan view of a single link of the chain shown in Fig. 1.

Fig. 3 is a side view of said link.

Fig. 4 is a longitudinal central section of the link taken along the line 4—4 of Fig. 2.

Fig. 5 is a transverse sectional view taken along the line 5—5 of Fig. 2.

Figs. 6 and 7 are, respectively, plan and side views of a modified form of link.

Fig. 8 is a longitudinal central section of the form of link shown in Fig. 6 and is taken as indicated by the line 8—8 of Fig. 6.

Fig. 9 is a transverse section across said link as indicated by the line 9—9 of Fig. 6.

Figs. 10 and 11 are, respectively, plan and side views of a modified form of link.

Fig. 12 is a longitudinal section of the link shown in Fig. 10 and is taken as indicated by the line 12—12 of Fig. 10.

Fig. 13 is a transverse section taken along the line 13—13 of Fig. 10.

Figs. 14 and 15 are, respectively, plan and side views of another form of link.

Figs. 16 and 17 are longitudinal and transverse sections of the form of link shown in Fig. 14 and are, respectively, taken along the lines 16—16 and 17—17 of Fig. 14.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, a length of chain suitable for use as a cross chain has been shown in Fig. 1 as being composed of a series of interconnected similar links 11. However, the links at the ends of the chain, which have no road engaging function, may be replaced by other links of more or less conventional and well known form. Each end link of the chain is joined with a suitable hook 12 or like member, by which the cross chain may be connected in a complete tire chain unit. Since all of the links as illustrated are substantially identical, only one will be described in detail.

Each link is generally rectangular in outline and is fashioned from a single piece of relatively heavy metal bar stock. While several modified forms of links are herein illustrated, a number of features are common to all of the forms. Thus, in each modification, the piece of bar stock is bent into double reverse form providing an intermediate or central bar 13 and end bars 14, 15, each joined to the intermediate bar by a relatively sharp bend or swing 16. The intermediate bar extends across the link on a line which is substantially at right angles to the longitudinal line of the link and the end bars are arranged to form, with the intermediate bar, identical closed loops by turning the end portions of the end bars toward and into overlying relation to the intermediate bar. The end portions thus extend along and define the opposite sides of the link and are arranged to overlie and extend across the same face of the intermediate bar, thus defining the road engaging face of the link. Preferably, the end portions are of sufficient length to pass completely across the intermediate bar and, in the forms shown in Figs. 1 to 13, inclusive, thence across the opposite end bars adjacent to, but preferably spaced more or less inwardly of, the peaks of the bends 16. Thus, each end portion of the stock crosses an intermediate portion thereof at two spaced points at least and a union is effected at each point of crossing in any suitable manner as by welding. In the form shown in Fig. 2, the spacing from the peak is sufficiently close to permit the welded union to be substantially continuous, although the principal welds are at the points of crossing. In the link shown in Fig. 6, a greater spacing is present and only the two welds at points of crossing are utilized. Near its extremity, each end portion of the bar is preferably sharply bent, as indicated at 17, between the points of crossing to cause the extremity to face laterally outwardly and terminate at and, if desired, slightly beyond the side of the link.

The loops of each link receive a corresponding loop of an adjacent link and the chain is completed by giving the loops a natural twist sufficient to permit the connected links to lie substantially flat in the same approximate plane. The link traversing position of the intermediate bar has a truss-like effect which greatly adds to the strength of each link. By uniting each end portion of the bar stock at least at two points with an intermediate portion thereof, greater security is obtained than would be the case where the union is at only one point of relatively small area. By turning the extremities of the end portions outwardly to project almost at right angles to the sides of the link, as in Figs. 1 to 13 inclusive, each end face of the stock becomes a heel 17a which is so disposed as to obtain excellent traction effect when the chain is in use.

Referring particularly to the form of links shown in Figs. 2 to 5, inclusive, it will be noted that when the link is given its natural twist, the intermediate bar is allowed to (or, if necessary, is caused to) bend slightly between its ends to form a central high point 18a (Fig. 5) directed toward the tire engaging face of the link. During this twisting operation, the major portion of the bending of each end bar 14 or 15 occurs beyond the point where the opposite extremity crosses said end bar. As a result, the end bars develop relatively pronounced peaks 18 (Figs. 3 and 4) located at diagonally opposite points on the tire side of the link, and the road engaging face of the link has a concave shape about a line which comprises generally one of the diagonals of the link. The peaks 18 and the high points 18a occupy substantially the same flat plane (see Fig. 3) and these three points constitute the parts of the link which are primarily in engagement with the face of the tire. The strains or forces resulting from engagement of the extremities and end portions with the road will, for the most part, be transmitted directly through the intermediate bar to the underlying tire.

In this form of link, the strain of twisting is so applied that each portion of the end bars immediately adjacent to the ends of the intermediate bar is given a slight bend or rise toward the road engaging surface of the link, or in a direction opposite to the bends which result in the peaks 18. These rising portions form slight protuberances 19 on the road engaging face of the link. Moreover, the end portions of the stock beyond the peaks 18 are substantially straight as seen from the side of the chain (Fig. 3) so that the end portions extend across the intermediate bar 13 and the protuberances 19 at an angle to the normal flat plane of the link. Hence, the end portions of the links have a slightly angular relationship to the road with the result that wear of each link occurs initially at the extreme ends of the stock, and thence progressively along the length of the end portions as distinguished from a link in which wear occurs simultaneously over a large area of the road engaging face of the link. Thus, it will be evident from a consideration of Figs. 3 and 7 that in use the links will first wear away the area of bar stock at the heels 17a and that, as wear progresses, each link will retain its unity until the material of each loop adjacent to the associated heel is worn through. It will be seen that as this condition of wear is approached, the worn areas will not yet have reached the unions between the end portions and the intermediate bar. All of these features result in a chain having excellent traction and wear resisting properties.

In the form of link shown in Figs. 6 to 9, inclusive, most of the features of the form of link illustrated in Figs. 1 to 5, inclusive, are present. However, in this form the intermediate bar is straight instead of longitudinally arcuate. The peaks 20 which correspond to the peaks 18, in the form previously described, are therefore the tire engaging portion of the link and the links are able to rock somewhat more freely with respect to the tire to bring the heels into engagement with the road.

With reference to the modified form of link shown in Figs. 10 to 13, inclusive, the intermediate bar is straight as in the form shown in Figs. 6 to 10, inclusive, but the end bars are twisted somewhat more sharply to eliminate the protuberances 19 and to provide bends, designated 21, in the end portions immediately adjacent to their points of crossing the intermediate bar. The end portions throughout the lengths (designated 22), which extend across the intermediate bar and the opposite end bar, are substantially in the plane of the road engaging face of the link, thereby providing a greater initial wearing area.

In the form of links shown in Figs. 14 to 17, inclusive, the primary distinction from the links shown in the other figures is that the angularly outturned end portions are substantially straight and are caused to extend in overlying relation as indicated at 23 along a length of the opposite end bar immediately adjacent to its point of union with the intermediate bar. The overlapping portions are suitably connected as by welding. This formation of the end portions of the end bars may be used in conjunction with any of the features of the other modifications of links.

It will be evident from the foregoing that a novel cross chain construction has been provided which possesses the desirable characteristics of excellent traction and resistance to wear. Each link, being formed of a single piece of bar stock, is relatively simple to manufacture. It has been found, moreover, that traction units having cross chains embodying the invention are, for some reason, exceedingly quiet in use.

I claim as my invention:

1. A tire chain comprising a series of interconnected looped links fashioned to lie in approximately a continuous plane; each of said links being formed of a single piece of stock bent into a double reverse shape to provide a center bar and end bars joined to the opposite ends of said center bar by bends located at opposite sides of the link; each of said end bars beyond said bends being formed to extend inwardly in the direction of the tire engaging surface of said plane to provide a tire engaging peak, and thence reversely toward the bend which includes the opposite end bar to extend thereacross on the road engaging side thereof, the last mentioned reversed portion of the end bar crossing said center bar and opposite end bar at points spaced inwardly of the peak of the bend, and a connecting union at each spaced point of crossing, the extreme ends of the end bars being turned outwardly of the side of the link.

2. A link for a tire chain comprising a piece of bar stock having a double reverse bend form, the end portions thereof being turned to extend in opposite directions in spaced substantially parallel relation to cross the opposite bends inwardly of the peaks of the bends, the end portions being located to cross the bends on the same face of the link and being intermediately angularly outturned to dispose the extremities of the end portions as laterally facing road engaging projections, and connecting unions at the points of crossing.

3. A link for a tire chain comprising a looped member having spaced side portions, and reenforcing parts bent to cross said side portions at spaced points on the road engaging side of the link, said parts being united with said side portions at each point of crossing and having prominent ends turned to extend in a laterally outward direction with respect to the associated side portion.

4. A link for a tire chain comprising a piece of bar stock having a double reverse bend form, the end portions thereof being turned to extend in opposite directions across the opposite bends adjacent to the peaks thereof, the crossing sections of the end portions each having a sharp bend to project the extremity of each portion laterally outwardly of the link and substantially on the plane thereof.

5. A link for the cross chain of a tire chain assembly comprising a piece of bar stock having a double reverse bend form, the end sections thereof being arcuate to return the end portions reversely to cross the opposite bends adjacent to the peaks thereof and on the road engaging face of the link, the end sections being twisted to provide tire engaging peaks at the ends of the link lying on a line extending diagonally of the link to permit rocking movement of the link on the tire along the diagonal line, said end portions being bent to face the extremities thereof outwardly of the associated sides of the link in a direction substantially perpendicular to said diagonal line.

6. A link for a chain assembly of the character described comprising a piece of bar stock having a double reverse bend form in which the end portions of the stock extend across intermediate portions thereof on the road engaging face of the link, said stock being intermediately curved to provide a peak at each end of the link for engagement with the tire surface so that in operation the link tends to rock on the line of said peaks as an axis, said end portions being connected to said intermediate portions and having bends therein providing extremities facing outwardly of the link in a direction substantially perpendicular to said axis.

7. A link for a chain assembly of the character described comprising a piece of bar stock so bent as to dispose the end portions of the stock in overlying relation to intermediate portions of the stock on the road engaging side of the link, abutting sections of said end and intermediate portions being united, said link having a line of engagement with the tire surface about which the link in use tends to rock, said end portions having bends near their extremities providing road engaging sections extending substantially at right angles to the line of rocking.

EARL A. STULLER.